United States Patent
Choi et al.

(10) Patent No.: US 12,493,934 B2
(45) Date of Patent: Dec. 9, 2025

(54) METHOD AND APPARATUS FOR IMAGE RESTORATION BASED ON BURST IMAGE

(71) Applicants: SAMSUNG ELECTRONICS CO., LTD., Suwon-si (KR); POSTECH Research and Business Development Foundation, Pohang-si (KR)

(72) Inventors: Jae Seok Choi, Suwon-si (KR); Minsu Cho, Pohang-si (KR); Sanghyun Kim, Pohang-si (KR); Jongmin Lee, Pohang-si (KR); Kinam Kwon, Suwon-si (KR); Geonseok Seo, Suwon-si (KR); Hyong Euk Lee, Suwon-si (KR)

(73) Assignees: Samsung Electronics Co., Ltd., Suwon-si (KR); POSTECH Research and Business Development Foundation, Pohang-si (KR)

(*) Notice: Subject to any disclaimer, the term of this patent is extended or adjusted under 35 U.S.C. 154(b) by 713 days.

(21) Appl. No.: 17/718,661

(22) Filed: Apr. 12, 2022

(65) Prior Publication Data
US 2023/0186432 A1    Jun. 15, 2023

(30) Foreign Application Priority Data
Dec. 15, 2021    (KR) .................. 10-2021-0179711

(51) Int. Cl.
*G06T 5/50*    (2006.01)
*G06T 5/60*    (2024.01)
(Continued)

(52) U.S. Cl.
CPC .................. *G06T 5/73* (2024.01); *G06T 5/60* (2024.01); *G06T 7/20* (2013.01); *G06V 10/761* (2022.01);
(Continued)

(58) Field of Classification Search
USPC .................. 128/920, 922–925; 382/103–107, 382/154–279
See application file for complete search history.

(56) References Cited

U.S. PATENT DOCUMENTS

| | | |
|---|---|---|
| 6,360,022 B1 | 3/2002 | Lubin et al. |
| 2005/0276504 A1 | 12/2005 | Chui et al. |

(Continued)

FOREIGN PATENT DOCUMENTS

| | | |
|---|---|---|
| CN | 112801890 A | 5/2021 |
| KR | 10-2019-0022126 A | 3/2019 |

(Continued)

OTHER PUBLICATIONS

Wenjia Niu, Deep Robust Image Deblurring via Blur Distilling and Infromation Comparison in Latent Space;2021 (Year: 2021).*

(Continued)

*Primary Examiner* — Marcellus J Augustin
(74) *Attorney, Agent, or Firm* — NSIP Law

(57) ABSTRACT

A method and apparatus for image restoration based on burst images. The method includes generating a plurality of feature representations corresponding to individual images of a burst image set by encoding the individual images, determining a reference feature representation from among the plurality of feature representations, determining a first comparison pair including the reference feature representation and a first feature representation of the plurality of feature representations, generating a first motion-embedding feature representation of the first comparison pair based on a similarity score map of the reference feature representation and the first feature representation, generating a fusion result by fusing a plurality of motion-embedding feature represen- (Continued)

tations including the first motion-embedding feature representation, and generating at least one restored image by decoding the fusion result.

22 Claims, 9 Drawing Sheets

(51) Int. Cl.
  *G06T 5/73* (2024.01)
  *G06T 7/00* (2017.01)
  *G06T 7/20* (2017.01)
  *G06V 10/74* (2022.01)
  *G06V 10/80* (2022.01)

(52) U.S. Cl.
  CPC .. *G06V 10/806* (2022.01); *G06T 2207/20084* (2013.01)

(56) References Cited

U.S. PATENT DOCUMENTS

| | | | |
|---|---|---|---|
| 2010/0002772 A1* | 1/2010 | Vandame | H04N 19/139 |
| | | | 375/E7.279 |
| 2010/0171840 A1 | 7/2010 | Yonekura | |
| 2011/0102642 A1 | 5/2011 | Wang et al. | |
| 2012/0242794 A1* | 9/2012 | Park | H04N 13/211 |
| | | | 348/46 |
| 2019/0197300 A1 | 6/2019 | Yang et al. | |
| 2019/0304067 A1 | 10/2019 | Vogels et al. | |
| 2020/0125852 A1 | 4/2020 | Carreira et al. | |
| 2020/0302185 A1 | 9/2020 | Hussein et al. | |
| 2020/0334856 A1 | 10/2020 | Staudinger et al. | |
| 2021/0201150 A1 | 7/2021 | Lin et al. | |
| 2021/0241470 A1 | 8/2021 | Tang et al. | |
| 2023/0123820 A1* | 4/2023 | Wang | G06N 3/088 |
| | | | 345/474 |

FOREIGN PATENT DOCUMENTS

| | | |
|---|---|---|
| KR | 10-2020-0138491 A | 12/2020 |
| KR | 10-2022-0114209 A | 8/2022 |

OTHER PUBLICATIONS

Ronneberger, Olaf, et al., "U-net: Convolutional Networks for Biomedical Image Segmentation", *Computer Science Department and BIOSS Centre for Biological Signalling Studies*, University of Freiburg, Germany, http://lmb.informatik.uni-freiburg.de/, arXiv:1505.04597v1 [cs.CV] May 18, 2015, (8 pages in English).

Mildenhall, Ben, et al., "Burst Denoising with Kernel Prediction Networks", Proceedings of the IEEE Conference on Computer Vision and Pattern Recognition. 2018, (9 pages in English).

Chen, Chen, et al., "Learning to See in the Dark", Proceedings of the IEEE conference on computer vision and pattern recognition. arXiv:1805.01934v1 [cs.CV] May 4, 2018, (10 pages in English).

Lv, Feifan, et al., "Attention Guided Low-light Image Enhancement with a Large Scale Low-light Simulation Dataset", arXiv:1908.00682v3 [eess.IV] Mar. 15, 2020, (18 pages in English).

Karadeniz, Ahmet Serdar, et al., "Burst Photography for Learning to Enhance Extremely Dark Images", arXiv:2006.09845v2 [cs.CV] Nov. 19, 2021, pp. 1-14.

Niu, Wenjia, et al., "Deep robust image deblurring via blur distilling and information comparison in latent space", Neurocomputing 466 (2021): 69-79.

Extended European search report issued on May 10, 2023, in counterpart European Patent Application No. 22189533.7 (12 pages in English).

* cited by examiner

METHOD AND APPARATUS FOR IMAGE RESTORATION BASED ON BURST IMAGE

CROSS-REFERENCE TO RELATED APPLICATIONS

This application claims the benefit under 35 USC § 119(a) of Korean Patent Application No. 10-2021-0179711, filed on Dec. 15, 2021, in the Korean Intellectual Property Office, the entire disclosure of which is incorporated herein by reference for all purposes.

BACKGROUND

1. Field

The following description relates to a method and apparatus for image restoration based on a burst image.

2. Description of Related Art

Image restoration refers to a technology for restoring an image of degraded quality to an image of improved quality. The image restoration may be performed using a deep learning-based neural network. The neural network may be trained based on deep learning, and then perform inference for the desired purpose by mapping input data and output data that are in a nonlinear relationship to each other. An ability to be trained to generate such mapping may be referred to as a learning ability of a neural network. Further, a neural network trained for a special purpose such as image restoration may have a generalization ability to generate a relatively accurate output in response to an input pattern that is not yet trained with.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented image restoration method includes generating a plurality of feature representations corresponding to individual images of a burst image set by encoding the individual images, determining a reference feature representation from among the plurality of feature representations, determining a first comparison pair including the reference feature representation and a first feature representation of the plurality of feature representations, generating a first motion-embedding feature representation of the first comparison pair based on a similarity score map of the reference feature representation and the first feature representation, generating a fusion result by fusing a plurality of motion-embedding feature representations including the first motion-embedding feature representation, and generating at least one restored image by decoding the fusion result.

The generating of the first motion-embedding feature representation may include: determining a first feature vector of a first point of the reference feature representation, and a first block of interest centered at a correspondence point of the first point in the first feature representation; generating a first similarity score map corresponding to the first point based on similarities between the first feature vector and channel vectors of the first block of interest; generating a first motion-aware kernel corresponding to the first point based on the first similarity score map; generating a first motion-embedding vector corresponding to the first point based on an operation between the first block of interest and the first motion-aware kernel; and generating the first motion-embedding feature representation based on motion-embedding vectors comprising the first motion-embedding vector.

The generating of the first motion-embedding feature representation may include: determining a second feature vector of a second point of the reference feature representation, and a second block of interest centered at a correspondence point of the second point in the first feature representation; and generating a second motion-embedding vector corresponding to the second point based on the second block of interest. The generating of the first motion-embedding feature representation may include generating the first motion-embedding feature representation based on the motion-embedding vectors comprising the first motion-embedding vector and the second motion-embedding vector.

The generating of the first motion-aware kernel may include: determining a first motion information vector corresponding to the first similarity score map; generating a first context information vector based on an operation between the first block of interest and the first similarity score map; and generating the first motion-aware kernel by fusing the first motion information vector and the first context information vector.

The generating of the first motion-aware kernel by fusing the first motion information vector and the first context information vector may include: generating a first channel vector corresponding to the first motion information vector using a first fully connected network; generating a second channel vector corresponding to the first context information vector using a second fully connected network; and generating the first motion-aware kernel by fusing the first channel vector and the second channel vector.

The generating of the feature representations may include encoding the individual images using an encoding model comprising at least one convolutional layer, and the generating of the at least one restored image may include decoding the fusion result using a decoding model comprising at least one up-convolutional layer.

The processor-implemented image restoration method may include: selecting an anchor image from among the individual images, and the determining of the reference feature representation may include determining a feature representation of the anchor image from among the feature representations to be the reference feature representation.

The selecting of the anchor image may include selecting the anchor image from among the individual images based on quality.

The individual images may include a first individual image and a second individual image, and the at least one restored image may include a first restored image of the first individual image and a second restored image of the second individual image. The determining of the reference feature representation may include: determining a feature representation of the first individual image from among the feature representations to be the reference feature representation, in case of restoring the first individual image as the first restored image; and determining a feature representation of the second individual image from among the feature representations to be the reference feature representation, in case of restoring the second individual image as the second restored image.

A non-transitory computer-readable storage medium storing instructions that, when executed by a processor, may cause the processor to perform the image restoration method.

In another general aspect, an image restoration apparatus includes a processor, and a memory configured to store instructions executable by the processor, wherein in response to the instructions being executed by the processor, the processor is configured to generate a plurality of feature representations corresponding to individual images of a burst image set by encoding the individual images, determine a reference feature representation from among the plurality of feature representations, determine a first comparison pair including the reference feature representation and a first feature representation of the plurality of feature representations, generate a first motion-embedding feature representation of the first comparison pair based on a similarity score map of the reference feature representation and the first feature representation, generate a fusion result by fusing a plurality of motion-embedding feature representations including the first motion-embedding feature representation, and generate at least one restored image by decoding the fusion result.

In another general aspect, an electronic device includes a camera configured to generate a burst image set including individual images, and a processor configured to generate a plurality of feature representations corresponding to the individual images by encoding the individual images, determine a reference feature representation from among the plurality of feature representations, determine a first comparison pair including the reference feature representation and a first feature representation of the plurality of feature representations, generate a first motion-embedding feature representation of the first comparison pair based on a similarity score map of the reference feature representation and the first feature representation, generate a fusion result by fusing a plurality of motion-embedding feature representations including the first motion-embedding feature representation, and generate at least one restored image by decoding the fusion result.

In another general aspect, an electronic device includes one or more processors configured to: acquire individual images included in an image burst set; calculate a correlation between the individual images to generate a kernel; generate a feature representation by applying a convolution operation to the individual images using the kernel; and enhance the individual images based on the feature representation and output an enhanced image burst set including the enhanced individual images.

Other features and aspects will be apparent from the following detailed description, the drawings, and the claims.

Figure 1:
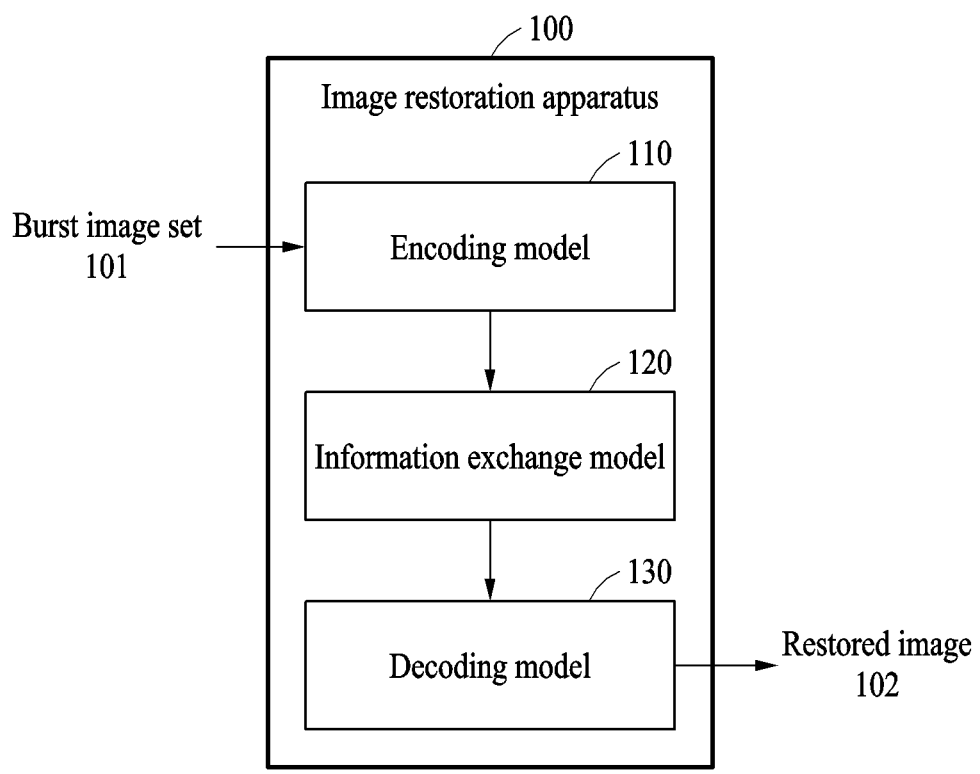
FIG. 1 illustrates an example of an operation of an image restoration apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed structural or functional description is provided as an example only and various alterations and modifications may be made to the examples. Here, the examples are not construed as limited to the disclosure and should be understood to include all changes, equivalents, and replacements within the idea and the technical scope of the disclosure.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or populations thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, examples will be described in detail with reference to the accompanying drawings. When describing the examples with reference to the accompanying drawings, like reference numerals refer to like components and a repeated description related thereto will be omitted.

FIG. 1 illustrates an example of an operation of an image restoration apparatus. Referring to FIG. 1, an image restoration apparatus 100 may receive a burst image set 101, generate a restored image 102 based on the burst image set 101, and output the restored image 102. The burst image set 101 may be generated by a camera (e.g., a camera 1030 of FIG. 10). The burst image set 101 may include a plurality of images that are continuously captured. For example, the burst image set 101 may be a video image generated through a video recording function or continuous still images generated through a burst shooting function. The plurality of images of the burst image set 101 may be referred to as individual images. For example, the burst image set 101 may include N individual images. In the case of a video, each image frame may correspond to an individual image, and in the case of burst shooting images, each still image may correspond to an individual image.

Assuming that the burst image set 101 is generated by capturing a target object using a camera, individual images of the burst image set 101 may have a variety of different characteristics due to a movement of the camera and/or the target object, and/or a change in ambient light (e.g., illuminance, color, etc.). When the burst image set 101 is captured in a poor environment, such as a low-illuminance environment, and/or individual images thereof have degraded quality, a restored image 102 having improved quality may be derived by appropriately combining various characteristics of the individual images. Accordingly, a high-quality restored image 102 may be derived through a restoration task on individual low-quality images.

The camera and/or the target object may move while the burst image set 101 is generated, and the individual images of the burst image set 101 may include degradation due to such motions. The image restoration apparatus 100 may perform image restoration in consideration of such motions. Due to the characteristic of the burst image set 101 being continuously generated in a relatively short time, a region of change of an image pixel caused by a motion may be limited. As described again below, the image restoration apparatus 100 may improve the computational efficiency required for motion analysis by using a limited size of similarity score map.

The image restoration apparatus 100 may generate feature representations corresponding to the individual images of the burst image set 101 by performing encoding based on the individual images, generate motion-embedding feature representations by performing information exchange between the feature representations, and generate the restored image 102 by performing decoding based on the motion-embedding feature representations. The image restoration apparatus 100 may perform the series of operations using an encoding model 110, an information exchange model 120, and a decoding model 130.

Any one or any combination of the encoding model 110, the information exchange model 120, and the decoding model 130 may be a neural network model. A neural network may correspond to a deep neural network (DNN) including a plurality of layers. In this case, the plurality of layers may include an input layer, at least one hidden layer, and an output layer.

The DNN may include at least one of a fully connected network (FCN), a convolutional neural network (CNN), or a recurrent neural network (RNN). For example, at least a portion of the layers included in the neural network may correspond to a CNN, and another portion of the layers may correspond to an FCN. In this case, the CNN may be referred to as convolutional layers, and the FCN may be referred to as fully connected layers.

In the case of a CNN, data input into each layer may be referred to as an input feature map, and data output from each layer may be referred to as an output feature map. The input feature map and the output feature map may be referred to as a feature representation or activation data. When a convolutional layer corresponds to an input layer, an input feature map of the input layer may be an input image.

The neural network may be trained based on deep learning, and then perform inference for the purpose of training by mapping input data and output data that are in a nonlinear relationship to each other. Deep learning is a machine learning technique for solving a problem such as image or speech recognition from a big data set. Deep learning may be construed as an optimization problem solving process of finding a point at which energy is minimized while training a neural network using prepared training data.

Through supervised or unsupervised learning of deep learning, a structure of the neural network or a weight corresponding to a model may be obtained, and the input data and the output data may be mapped to each other through the weight. If the width and the depth of the neural network are sufficiently great, the neural network may have a capacity sufficient to implement a predetermined function. The neural network may achieve an optimized performance when learning a sufficiently large amount of training data through an appropriate training process.

The neural network may be expressed as being trained in advance, where "in advance" means "before" the neural network starts. That the neural network "starts" means that the neural network is ready for inference. For example, that the neural network "starts" may include that the neural network is loaded into a memory, or that input data for inference is input into the neural network after the neural network is loaded into the memory.

The image restoration apparatus 100 may execute the neural network model using motion information. The image restoration apparatus 100 may generate a motion-embedding feature representation by performing information exchange between the feature representations of the individual images. Information exchange may be performed through a motion-aware model of the information exchange model 120. The image restoration apparatus 100 may perform information exchange based on a similarity score map between the feature representations of the individual images. The motion-embedding feature representations may include motion information of the individual images according to the motions of the camera and/or the target object. The image restoration apparatus 100 may improve the quality of the restored image 102 by performing image restoration in consideration of such motion information. Due to the characteristic of the burst image set 101 continuously generated in a relatively short time, a region of change of an image pixel caused by a motion may be limited. Thus, the image restoration apparatus 100 may efficiently use the motion information by using the limited size of similarity score map.

Figure 2:
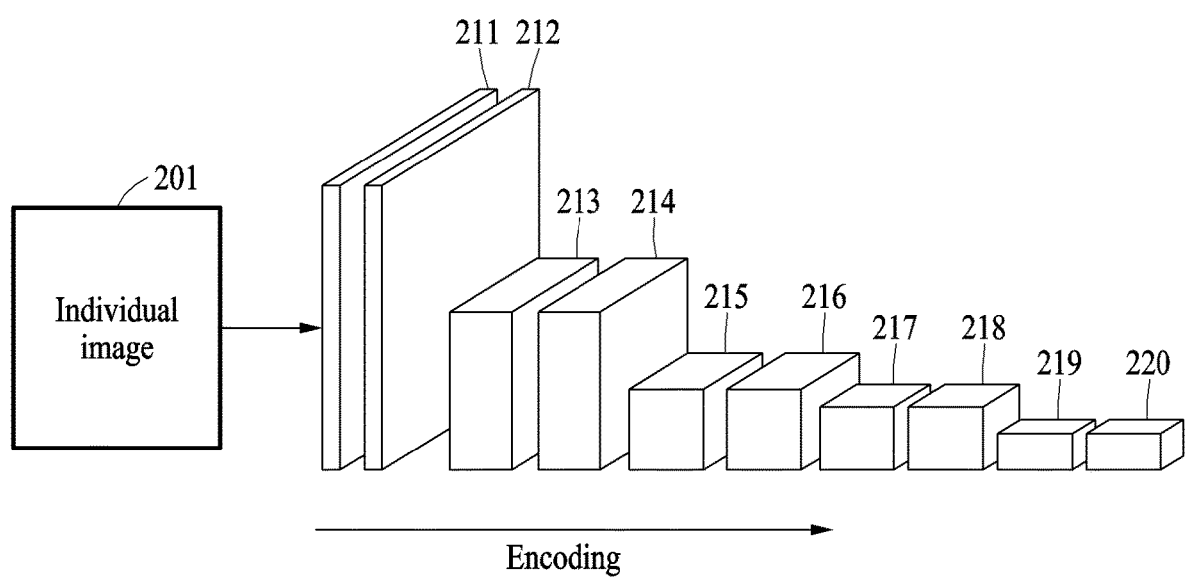
FIG. 2 illustrates an example of encoding an input image to feature representations.

FIG. 2 illustrates an example of encoding an input image to feature representations. Referring to FIG. 2, an image restoration apparatus may generate a feature representation 220 by encoding an individual image 201. The individual image 201 may be encoded using an encoding model. While the individual image 201 is encoded, the individual image 201 may pass through various neural network layers (e.g., at least one convolutional layer).

For example, a first layer and a second layer of the encoding model may each correspond to a convolutional layer. The first layer may generate a first intermediate feature representation 211 by performing a convolution operation according to the individual image 201, and the second layer may generate a second intermediate feature representation 212 by performing a convolution operation according to the first intermediate feature representation 211. A third layer may correspond to a pooling layer. The third layer may generate a third intermediate feature representation 213 by performing a pooling operation according to the second intermediate feature representation 212. Following layers may alternately perform a convolution operation and a pooling operation on the intermediate feature representations 213 to 219, and as a result, the feature representation 220 may be generated.

Hereinafter, the size of data may be expressed in the form of height×width×channel. For example, the size of the individual image 201 may be H×W×4. The channel size of intermediate feature representations 211 and 212 may be 32, the channel size of intermediate feature representations 213 and 214 may be 64, the channel size of intermediate feature representations 215 and 216 may be 128, and the channel size of intermediate feature representations 217 and 218 may be 256. The size of an intermediate feature representation 219 and the size of the feature representation 220 may be H'×W'×512. However, the above layer arrangement and data size of the encoding model are merely examples, and other various layer arrangements and data sizes may be used. An encoding model may be iteratively executed on individual images of a burst image set, whereby feature representations corresponding to the individual images may be generated.

Figure 3:
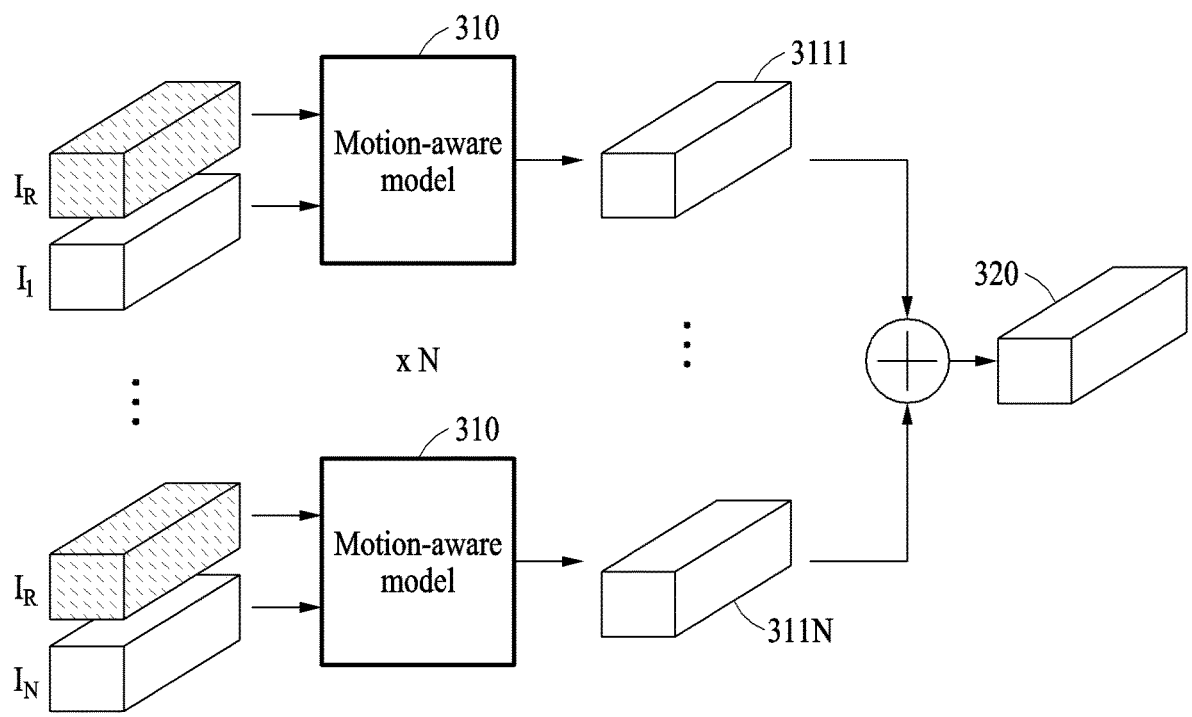
FIG. 3 illustrates an example of generating motion-embedding feature representations of feature representations and fusing the motion-embedding feature representations.

FIG. 3 illustrates an example of generating motion-embedding feature representations of feature representations and fusing the motion-embedding feature representations. Referring to FIG. 3, an image restoration apparatus may determine a reference feature representation IR from among feature representations $I_1$ to $I_N$, and determine comparison pairs including the reference feature representation IR and the feature representations $I_1$ to $I_N$, respectively. The size of the reference feature representation IR and the size of the feature representations $I_1$ to $I_N$ may be H'×W'×c. The number of individual images in the burst image set, the number of feature representations $I_1$ to $I_N$, and the number of comparison pairs may all be "N". For example, a first comparison pair may include the reference feature representation IR and a first feature representation h, and a second comparison pair may include the reference feature representation IR and a second feature representation 12. The first feature representation h may correspond to a first individual image, and the second feature representation 12 may correspond to a second individual image.

The image restoration apparatus may generate motion-embedding feature representations 3111 to 311N by executing a motion-aware model 310 based on the comparison pairs. The motion-aware model 310 may perform information exchange between feature representations of each comparison pair based on motion information of the feature representations. The motion-aware model 310 may be iteratively executed as many times as the number of comparison pairs, and the motion-embedding feature representations 3111 to 311N corresponding to the number of comparison pairs may be generated. The operation of the motion-aware model 310 will be described later in detail. The image restoration apparatus may generate a fusion result 320 by fusing the motion-embedding feature representations 3111 to 311N. The size of the fusion result may be H×W×C. For example, the image restoration apparatus may generate the fusion result 320 by performing an elementwise addition.

Figure 4:
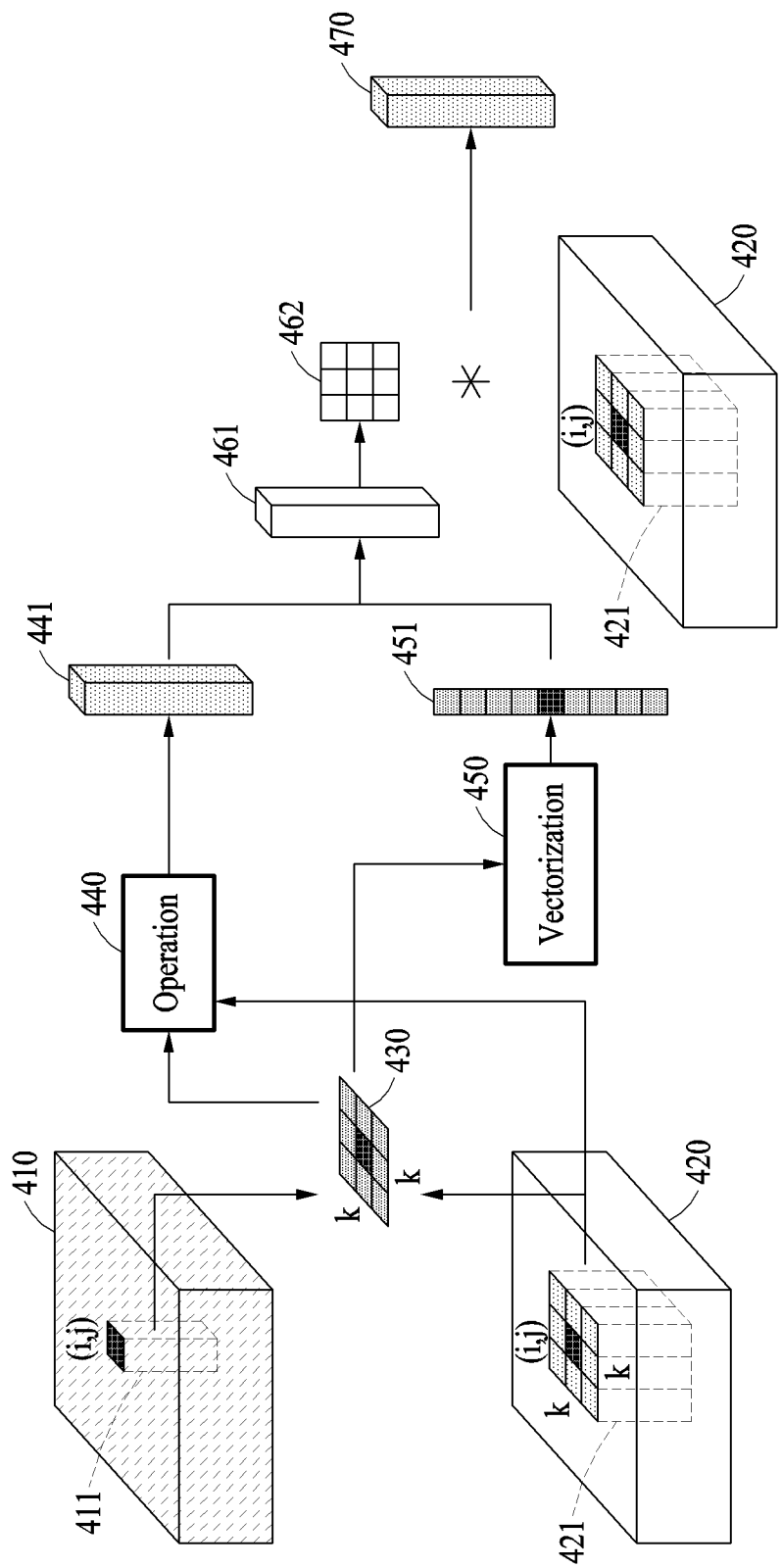
FIG. 4 illustrates an example of generating motion-embedding feature representations.

FIG. 4 illustrates an example of generating motion-embedding feature representations. Referring to FIG. 4, an image restoration apparatus may generate a motion-embedding feature representation of a comparison pair including a reference feature representation 410 and a feature representation 420. For example, the feature representation 420 may be a first feature representation, and the comparison pair may be a first comparison pair. The operation of FIG. 4 may be performed through a motion-aware model.

The image restoration apparatus may determine a feature vector 411 of a point (i, j) of the reference feature representation 410, and determine a block of interest 421 centered at a point (i, j) in the feature representation 420. The reference feature representation 410 and the feature representation 420 may have a size of H'×W'×c, and the point (i, j) of the reference feature representation 410 and the point (i, j) of the feature representation 420 may correspond to each other. These points may be referred to as correspondence points.

The image restoration apparatus may generate a similarity score map 430 corresponding to the point (i, j) based on similarities between the feature vector 411 and channel vectors of the block of interest 421. For example, the size of the feature vector 411 may be 1×1×c, the size of the block of interest 421 may be k×k×c, and the size of the similarity score map 430 may be k×k×1. k×k may be a value significantly smaller than H'×W'. Since burst images are continuously generated in a relatively short time, a region of change of an image pixel caused by a motion may be limited. As the size of the similarity score map 430 is limited to k×k, the computational efficiency required for motion analysis may improve. The block of interest 421 may include k×k channel vectors, and the size of each channel vector may be 1×1×c. The similarity score map 430 may include k×k score elements, and the score elements may indicate the similarities between the feature vector 411 and the channel vectors of the block of interest 421. For example, the similarities may correspond to cosine similarities or network-based correlations. In the latter case, a separate neural network may be added to calculate such correlations.

The image restoration apparatus may generate a motion-aware kernel 462 corresponding to the point (i, j) based on the similarity score map 430. The image restoration apparatus may generate a context information vector 441 based on an operation 440 between the block of interest 421 and the similarity score map 430. For example, the operation 440 may correspond to a dot product. The size of the context information vector 441 may be 1×1×c. The image restoration apparatus may determine a motion information vector 451 corresponding to the similarity score map 430 based on vectorization 450 of the similarity score map 430. For example, the vectorization 450 may correspond to flattening. The size of the motion information vector 451 may be $1 \times 1 \times k^2$. The image restoration apparatus may generate a fusion result 461 by fusing the motion information vector 451 and the context information vector 441, and may determine the motion-aware kernel 462 based on the fusion result 461. The size of the fusion result 461 may be $1 \times 1 \times k^2$, and the size of the motion-aware kernel 462 may be k×k×1.

The image restoration apparatus may generate a motion-embedding vector 470 corresponding to the point (i, j) based on an operation between the block of interest 421 and the motion-aware kernel 462. For example, the operation may be a convolution operation. The size of the motion-embedding vector 470 may be 1×1×c. The image restoration apparatus may generate a motion feature representation having motion embedding vectors of H'×W'×c by iteratively performing the series of operations as many times as H'×W'×c while changing the points (i, j). For example, when the motion-embedding vector 470 corresponds to a first motion-embedding vector of a first point, the image restoration apparatus may generate a second motion-embedding vector of a second point and generate a motion-embedding feature representation based on motion-embedding vectors including the first motion-embedding vector and the second motion-embedding vector. When the reference feature representation 410 and the feature representation 420 constitute a first feature pair, the motion-embedding feature representation may correspond to the first feature pair.

Figure 5:
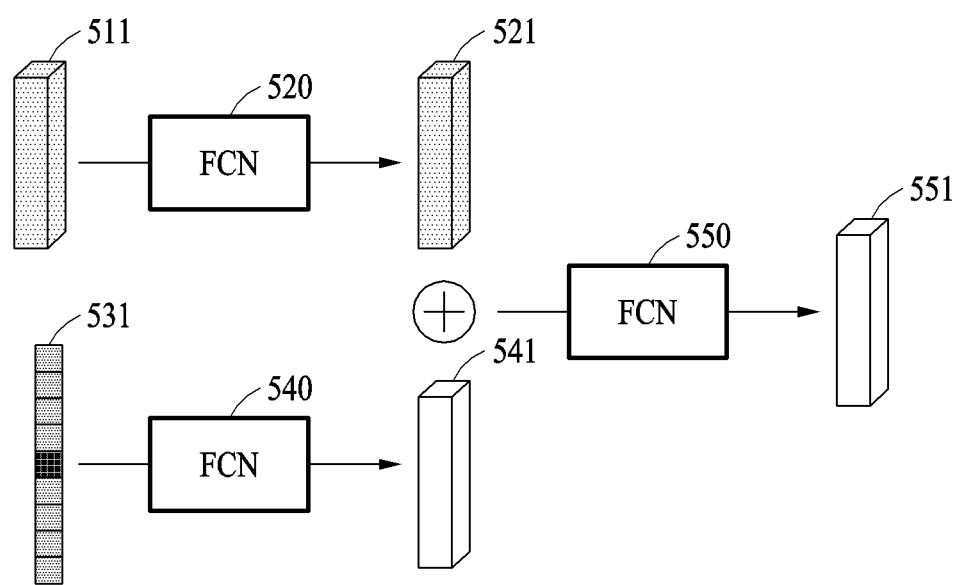
FIG. 5 illustrates an example of fusing a motion information vector and a context information vector.

FIG. 5 illustrates an example of fusing a motion information vector and a context information vector. Referring to FIG. 5, a channel vector 521 corresponding to a context information vector 511 may be generated using an FCN 520, and a channel vector 541 corresponding to a motion information vector 531 may be generated using an FCN 540. The context information vector 511 and the motion information vector 531 may be difference in size. The FCNs 520 and 540 may adjust the size of the context information vector 511 and the size of the motion information vector 531. The FCNs 520 and 540 may enable the channel vector 521 and the channel vector 541 to have the same size. For example, the size of the context information vector 511 may be 1×1×c, the size of the motion information vector 531 may be 1×1×$k^2$, and the size of the channel vectors 521 and 541 may be 1×1×c. The FCNs 520 and 540 may each include one or more fully connected layers.

The channel vectors 521 and 541 may be fused and input to an FCN 550. For example, the channel vectors 521 and 541 may be fused through an elementwise addition. An output vector 551 of the FNC 550 may correspond to the fusion result 461 of FIG. 4. The FCN 550 may adjust the size of the channel vectors 521 and 541. For example, the size of the output vector 551 may be 1×1×$k^2$. The FCN 550 may include one or more fully connected layers. The output vector 551 may be transformed into a motion-aware kernel.

The context information vector 511 and the motion information vector 531 may be fused in various manners other than the operation of FIG. 5. In addition, other neural networks may be used in addition to the FCNs 520, 540, and 550, and further, a neural network structure different from that of FIG. 5 may be used.

Figure 6:
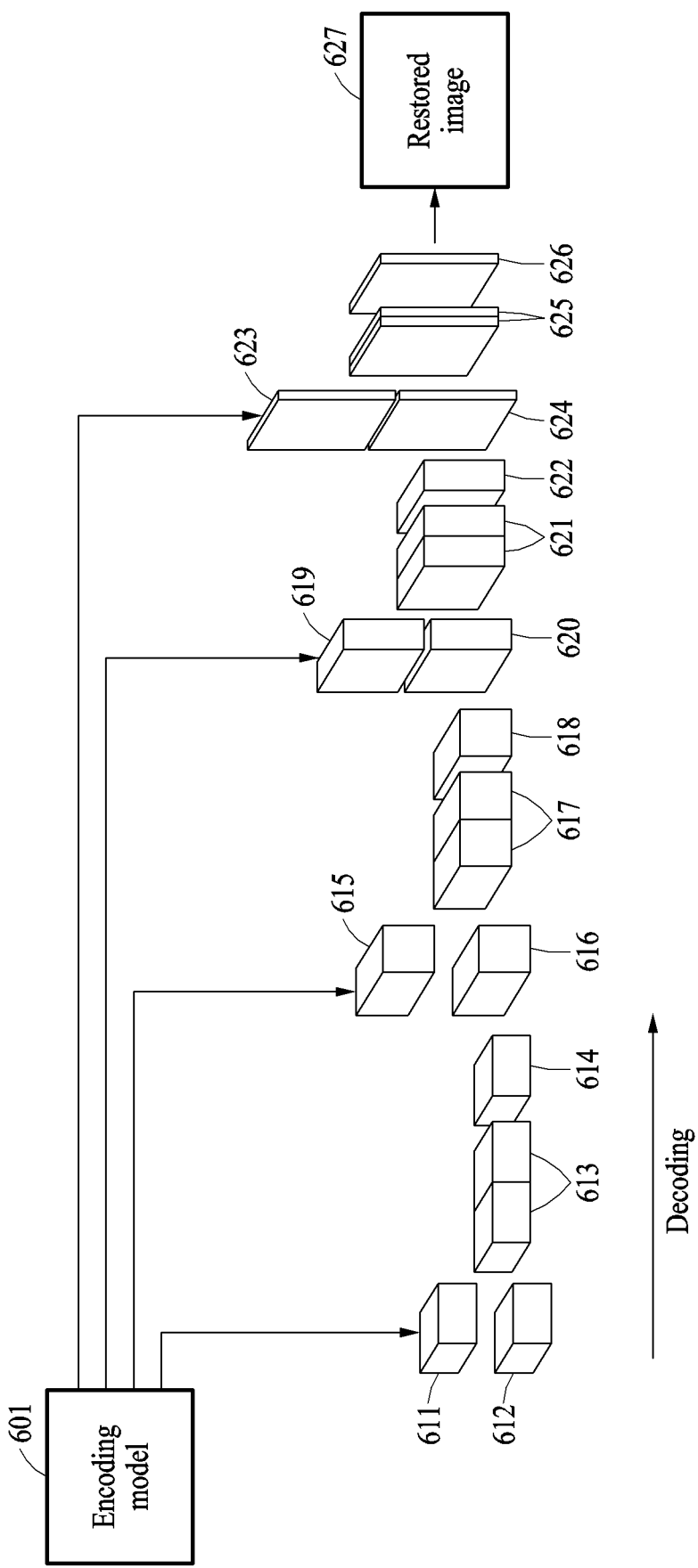
FIG. 6 illustrates an example of decoding feature representations to a restored image.

FIG. 6 illustrates an example of decoding feature representations to a restored image. Referring to FIG. 6, an image restoration apparatus may generate a restored image 627 by decoding a feature representation 612. The feature representation 612 may correspond to a fusion result (e.g., the fusion result 320) of motion-embedding feature representations. The feature representation 612 may be decoded using a neural network-based decoding model. While the feature representation 612 is decoded, the feature representation 612 may pass through various neural network layers (e.g., at least one up-convolutional layer).

A feature representation 613 may be determined by combining a feature representation 611 and the feature representation 612. For example, the feature representations 611 and 612 may be combined through concatenation. The feature representation 611 may be received from an encoding model 601 via skip-connection. For example, the feature representation 611 may correspond to the feature representation 218 of FIG. 2. A feature representation 614 may be transformed into a feature representation 616. For example, the feature representation 614 may be determined based on a convolution operation according to the feature representation 613. The channel size of the feature representations 611 and 612 may be 256, the channel size of the feature representation 613 may be 512, and the channel size of the feature representation 614 may be 256.

The feature representation 614 may be determined based on an up-convolution according to the feature representation 614. A feature representation 615 may be received from the encoding model 601 via skip-connection. For example, the feature representation 615 may correspond to the feature representation 216 of FIG. 2. A feature representation 617 may be determined by combining the feature representations 615 and 616. For example, the feature representations 615 and 616 may be combined through concatenation. The feature representation 617 may be transformed into a feature representation 618. For example, the feature representation 618 may be determined based on a convolution operation according to the feature representation 617. The channel size of the feature representations 615 and 616 may be 128, the channel size of the feature representation 617 may be 256, and the channel size of the feature representation 618 may be 128.

An operation corresponding to the operation applied to the feature representations 615 to 618 may also apply to feature representations 619 to 626. The channel size of the feature representations 619 and 620 may be 64, the channel size of the feature representation 621 may be 128, the channel size of the feature representation 622 may be 64, the channel size of the feature representations 623 and 624 may be 32, the channel size of the feature representation 625 may be 64, and the channel size of the feature representation 626 may be 32. A restored image 627 may be determined based on the feature representation 626. The restored image 627 may have the same size as an individual image. For example, the size of the restored image 627 may be H×W×4.

Figure 7:
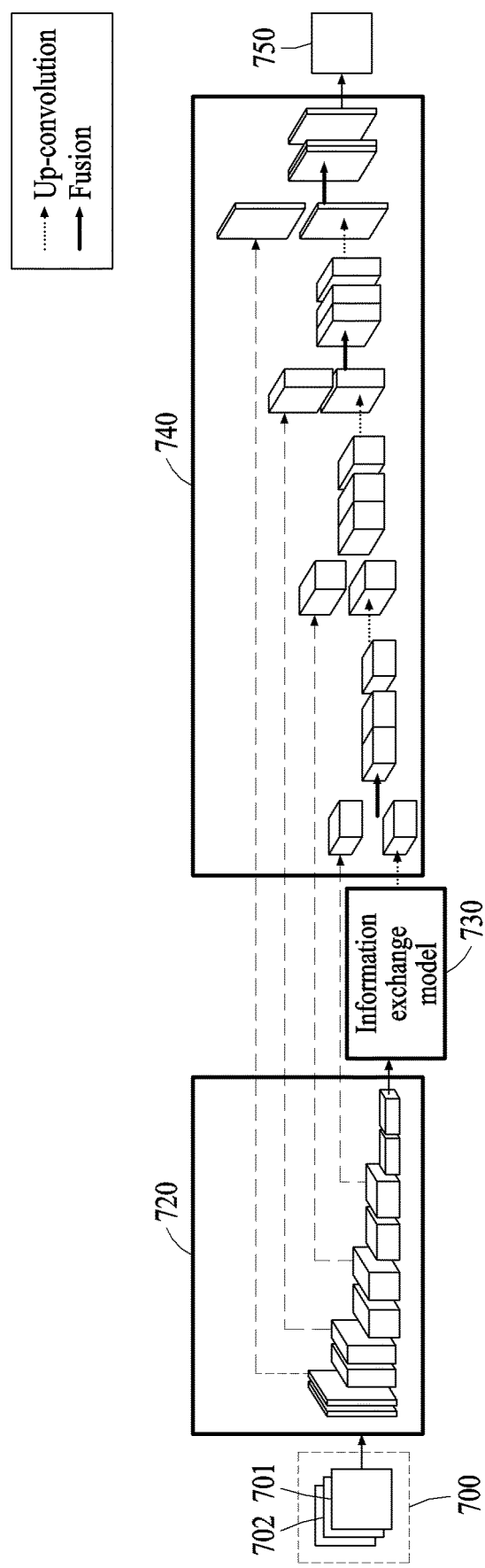
FIG. 7 illustrates an example of data flow.

FIG. 7 illustrates an example of data flow. Referring to FIG. 7, a burst image set 710 may include individual images 701 and 702. An encoding model 720 may generate a plurality of feature representations corresponding to the individual images 701 and 702 by encoding the individual images 701 and 702. For example, the encoding model 720 may generate a first feature representation corresponding to the first individual image 701 and a second feature representation corresponding to the second individual image 702. For example, the first feature representation and the second feature representation may each correspond to the feature representation 220 of FIG. 2.

An information exchange model 730 may generate a fusion result of motion-embedding feature representations by performing information exchange of a comparison pair of feature representations. An image restoration apparatus may determine a reference feature representation from among the feature representations, and determine comparison pairs each including the reference feature representation and one of the feature representations. For example, when there are N feature representations including a first feature representation to an N-th feature representation, and a reference feature representation is selected from among the N feature representations, N comparison pairs including a first comparison pair including the reference feature representation and the first feature representation to an N-th comparison pair including the reference feature representation and the N-th feature representation may be determined.

When the reference feature representation is determined, image restoration may be performed based on the reference feature representation. According to an example, the image restoration apparatus may select an anchor image from the individual images 701 and 702 and determine a feature representation of the anchor image from among the feature representations to be the reference feature representation. In this case, image restoration may be performed according to one reference feature, and a single restored image 750 may be generated. The image restoration apparatus may select the anchor image from among individual images based on quality. More specifically, the image restoration apparatus may evaluate the qualities of the individual images 701 and 702, and may select one having the highest quality from the individual images 701 and 702 as the anchor image.

According to another example, the individual images 701 and 702 may be sequentially selected as the anchor image. In this case, N feature representations corresponding to the individual images 701 and 702 may be sequentially used as the reference feature representation, and N restored images may be generated. For example, in the case of restoring the first individual image 701 as the first restored image, the feature representation of the first individual image among the feature representations may be determined to be the reference feature representation, and motion-embedding feature representations may be generated using the reference feature representation. Further, in the case of restoring the second individual image 702 as the second restored image, the feature representation of the second individual image among the feature representations may be determined to be the reference feature representation, and motion-embedding feature representations may be generated using the reference feature representation.

A decoding model 740 may generate at least one restored image 750 by decoding the fusion result of the motion-embedding feature representations. Arrows from the encoding model 720 to the decoding model 740 may indicate skip-connection, dotted arrows in the decoding model 740 may indicate up-convolution, and solid arrows in the decoding model 740 may indicate fusion. For example, fusion may correspond to concatenation.

Figure 8:
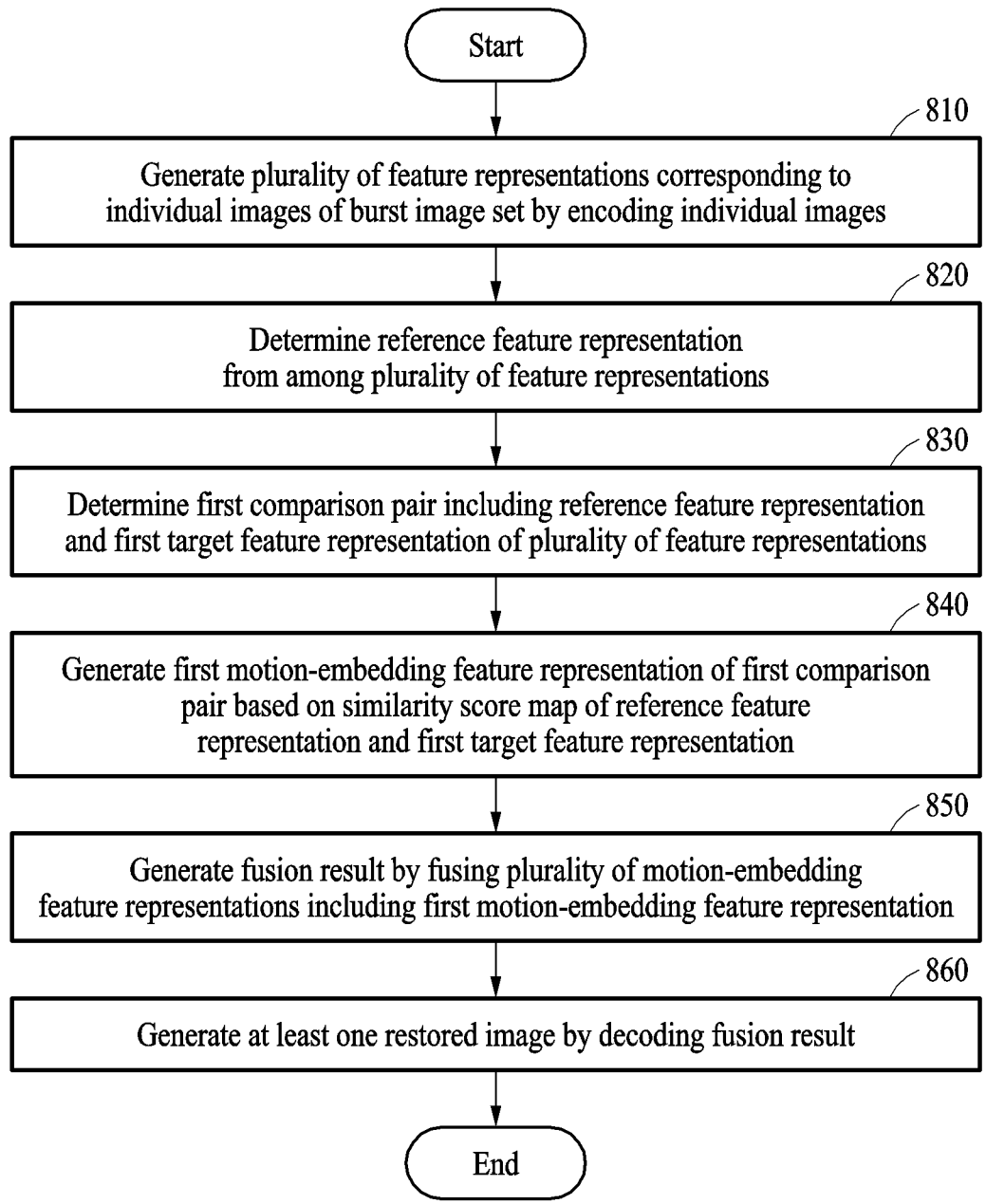
FIG. 8 illustrates an example of an image restoration method.

FIG. 8 illustrates an example of an image restoration method. Referring to FIG. 8, in operation 810, an image restoration apparatus generates feature representations corresponding to individual images of a burst image set by encoding the individual images. The image restoration apparatus may encode the individual images using an encoding model including at least one convolutional layer.

In operation 820, the image restoration apparatus determines a reference feature representation from among the plurality of feature representations. The image restoration apparatus may select an anchor image from among the individual images, and determine a feature representation of the anchor image from among the feature representations to be the reference feature representation. The image restoration apparatus may select the anchor image from among individual images based on quality. The individual images may include a first individual image and a second individual image, and the at least one restored image may include a first restored image of the first individual image and a second restored image of the second individual image. In this case, the image restoration apparatus may determine a feature representation of the first individual image from among the feature representations to be the reference feature representation, in case of restoring the first individual image as the first restored image, and determine a feature representation of the second individual image from among the feature representations to be the reference feature representation, in case of restoring the second individual image as the second restored image.

In operation 830, the image restoration apparatus determines a first comparison pair including the reference feature representation and a first feature representation of the plurality of feature representations. In operation 840, the image restoration apparatus generates a first motion-embedding feature representation of the first comparison pair based on a similarity score map of the reference feature representation and the first feature representation.

The image restoration apparatus may determine a first feature vector of a first point of the reference feature representation and a first block of interest centered at a correspondence point of the first point in the first feature representation, generate a first similarity score map corresponding to the first point based on similarities between the first feature vector and channel vectors of the first block of interest, generate a first motion-aware kernel corresponding to the first point based on the first similarity score map, generate a first motion-embedding vector corresponding to the first point based on an operation between the first block of interest and the first motion-aware kernel, and generate the first motion-embedding feature representation based on motion-embedding vectors including the first motion-embedding vector.

The image restoration apparatus may determine a second feature vector of a second point of the reference feature representation and a second block of interest centered at a correspondence point of the second point in the first feature representation, and generate a second motion-embedding vector corresponding to the second point based on the second block of interest. The image restoration apparatus may generate the first motion-embedding feature representation based on the motion-embedding vectors including the first motion-embedding vector and the second motion-embedding vector.

The image restoration apparatus may determine a first motion information vector corresponding to the first similarity score map, generate a first context information vector based on an operation between the first block of interest and the first similarity score map, and generate the first motion-aware kernel by fusing the first motion information vector and the first context information vector. The image restoration apparatus may generate a first channel vector corresponding to the first motion information vector using a first FCN, generate a second channel vector corresponding to the first context information vector using a second FCN, and generate the first motion-aware kernel by fusing the first channel vector and the second channel vector.

In operation 850, the image restoration apparatus generates a fusion result by fusing a plurality of motion-embedding feature representations including the first motion-embedding feature representation. In operation 860, the image restoration apparatus generates at least one restored image by decoding the fusion result. The image restoration apparatus may decode the fusion result using a decoding model including at least one up-convolutional layer.

Figure 9:
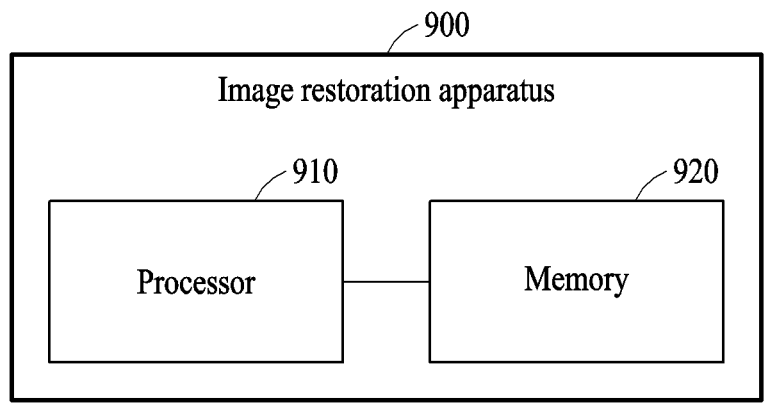
FIG. 9 illustrates an example of a configuration of an image restoration apparatus.

FIG. 9 illustrates an example of a configuration of an image restoration apparatus. Referring to FIG. 9, an image restoration apparatus 900 includes a processor 910 and a memory 920. The memory 920 may be connected to the processor 910 and store instructions executable by the processor 910, data to be computed by the processor 910, or data processed by the processor 910. The memory 920 may include a non-transitory computer-readable medium (for example, a high-speed random access memory) and/or a non-volatile computer-readable medium (e.g., at least one disk storage device, flash memory device, or another non-volatile solid-state memory device).

The processor 910 may execute the instructions to perform the operations described above with reference to FIGS. 1 to 8, and 10. For example, the processor 910 may generate a plurality of feature representations corresponding to individual images of a burst image set by encoding the individual images, determine a reference feature representation from among the plurality of feature representations, determine a first comparison pair including the reference feature representation and a first feature representation of the plurality of feature representations, generate a first motion-embedding feature representation of the first comparison pair based on a similarity score map of the reference feature representation and the first feature representation, generate a fusion result by fusing a plurality of motion-embedding feature representations including the first motion-embedding feature representation, and generate at least one restored image by decoding the fusion result. In addition, the description provided with reference to FIGS. 1 to 8, and 10 may apply to the image restoration apparatus 900.

Figure 10:
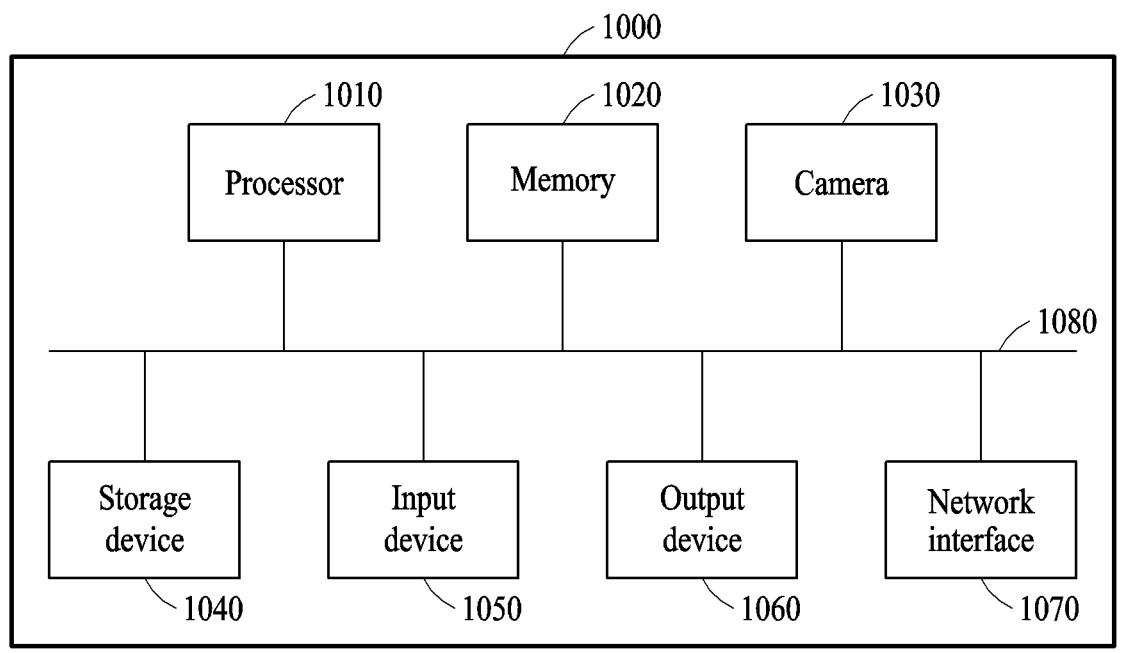
FIG. 10 illustrates an example of a configuration of an electronic device.

FIG. 10 illustrates an example of a configuration of an electronic device. Referring to FIG. 10, an electronic device 1000 may include a processor 1010, a memory 1020, a camera 1030, a storage device 1040, an input device 1050, an output device 1060, and a network interface 1070 that may communicate with one another through a communication bus 1080. For example, the electronic device 1000 may be implemented as at least a part of a mobile device such as a mobile phone, a smart phone, a PDA, a netbook, a tablet computer or a laptop computer, a wearable device such as a smart watch, a smart band or smart glasses, a computing device such as a desktop or a server, a home appliance such as a television, a smart television or a refrigerator, a security device such as a door lock, or a vehicle such as an autonomous vehicle or a smart vehicle. The electronic device 1000 may structurally and/or functionally include the image restoration apparatus 100 of FIG. 1 and/or the image restoration apparatus 900 of FIG. 9.

The processor 1010 executes functions and instructions to be executed in the electronic device 1000. For example, the processor 1010 may process instructions stored in the memory 1020 or the storage device 1040. The processor 1010 may perform the one or more operations described in FIGS. 1 to 9. The memory 1020 may include a computer-readable storage medium or a computer-readable storage device. The memory 1020 may store instructions to be executed by the processor 1010 and may store related information while software and/or an application is executed by the electronic device 1000.

The camera 1030 may capture a photo and/or record a video. The camera 1030 may generate a burst image set by continuously capturing photos or recording a video. If the burst image set is continuous photos, each individual image of the burst image set may correspond to each photo, and if the burst image set is a video, each individual image of the burst image set may correspond to each image frame of the video. The storage device 1040 includes a computer-readable storage medium or computer-readable storage device. The storage device 1040 may store a more quantity of information than the memory 1020 for a long time. For example, the storage device 1040 may include a magnetic hard disk, an optical disc, a flash memory, a floppy disk, or other non-volatile memories known in the art.

The input device 1050 may receive an input from the user in traditional input manners through a keyboard and a mouse, and in new input manners such as a touch input, a voice input, and an image input. For example, the input device 1050 may include a keyboard, a mouse, a touch screen, a microphone, or any other device that detects the input from the user and transmits the detected input to the electronic device 1000. The output device 1060 may provide an output of the electronic device 1000 to the user through a visual, auditory, or haptic channel. The output device 1060 may include, for example, a display, a touch screen, a speaker, a vibration generator, or any other device that provides the output to the user. The network interface 1070 may communicate with an external device through a wired or wireless network.

The image restoration apparatus and other devices, apparatuses, units, modules, and components described herein with respect to FIGS. 1-7, 9, and 10 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-8, for example, that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computer.

A number of examples have been described above. Nevertheless, it should be understood that various modifications may be made to these examples. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

What is claimed is:

1. A processor-implemented image restoration method, comprising:
    generating a plurality of feature representations corresponding to a plurality of individual images of a burst image set where the plurality of individual images was continuously captured, the plurality of feature representations were generated by encoding the individual images;
    determining a feature representation from among the plurality of feature representations as a reference feature representation;
    determining a first comparison pair comprising the reference feature representation and a first feature representation of the plurality of feature representations;
    generating, based on a similarity score map of the reference feature representation and the first feature representation, a first motion-embedding feature representation of the first comparison pair;
    generating a fusion result by fusing a plurality of motion-embedding feature representations comprising the first motion-embedding feature representation; and
    generating at least one restored image by decoding the fusion result.

2. The processor-implemented image restoration method of claim 1, wherein the generating of the first motion-embedding feature representation comprises:
    determining a first feature vector of a first point of the reference feature representation, and a first block of interest centered at a correspondence point of the first point in the first feature representation;
    generating a first similarity score map corresponding to the first point based on similarities between the first feature vector and channel vectors of the first block of interest;
    generating a first motion-aware kernel corresponding to the first point based on the first similarity score map;
    generating a first motion-embedding vector corresponding to the first point based on an operation between the first block of interest and the first motion-aware kernel; and
    generating the first motion-embedding feature representation based on motion-embedding vectors comprising the first motion-embedding vector.

3. The processor-implemented image restoration method of claim 2, wherein the generating of the first motion-embedding feature representation comprises:
    determining a second feature vector of a second point of the reference feature representation, and a second block of interest centered at a correspondence point of the second point in the first feature representation; and
    generating a second motion-embedding vector corresponding to the second point based on the second block of interest,
    wherein the generating of the first motion-embedding feature representation comprises generating the first motion-embedding feature representation based on the motion-embedding vectors comprising the first motion-embedding vector and the second motion-embedding vector.

4. The processor-implemented image restoration method of claim 2, wherein the generating of the first motion-aware kernel comprises:
 determining a first motion information vector corresponding to the first similarity score map;
 generating a first context information vector based on an operation between the first block of interest and the first similarity score map; and
 generating the first motion-aware kernel by fusing the first motion information vector and the first context information vector.

5. The processor-implemented image restoration method of claim 4, wherein the generating of the first motion-aware kernel by fusing the first motion information vector and the first context information vector comprises:
 generating a first channel vector corresponding to the first motion information vector using a first fully connected network;
 generating a second channel vector corresponding to the first context information vector using a second fully connected network; and
 generating the first motion-aware kernel by fusing the first channel vector and the second channel vector.

6. The processor-implemented image restoration method of claim 1, wherein
 the generating of the feature representations comprises encoding the individual images using an encoding model comprising at least one convolutional layer, and
 the generating of the at least one restored image comprises decoding the fusion result using a decoding model comprising at least one up-convolutional layer.

7. The processor-implemented image restoration method of claim 1, further comprising:
 selecting an anchor image from among the individual images,
 wherein the determining of the reference feature representation comprises determining a feature representation of the anchor image from among the feature representations to be the reference feature representation.

8. The processor-implemented image restoration method of claim 7, wherein the selecting of the anchor image comprises selecting the anchor image from among the individual images based on quality.

9. The processor-implemented image restoration method of claim 1, wherein
 the individual images comprise a first individual image and a second individual image, and
 the at least one restored image comprises a first restored image of the first individual image and a second restored image of the second individual image,
 wherein the determining of the reference feature representation comprises:
 determining a feature representation of the first individual image from among the feature representations to be the reference feature representation, in case of restoring the first individual image as the first restored image; and
 determining a feature representation of the second individual image from among the feature representations to be the reference feature representation, in case of restoring the second individual image as the second restored image.

10. A non-transitory computer-readable storage medium storing instructions that, when executed by a processor, cause the processor to perform the image restoration method of claim 1.

11. An image restoration apparatus, comprising:
 a processor; and
 a memory configured to store instructions executable by the processor,
 wherein in response to the instructions being executed by the processor, the processor is configured to:
 generate a plurality of feature representations corresponding to a plurality of individual images of a burst image set where the plurality of individual images was continuously captured, the plurality of feature representations were generated by encoding the individual images,
 determine a reference feature representation from among the plurality of feature representations,
 determine a first comparison pair comprising the reference feature representation and a first feature representation of the plurality of feature representations,
 generate, based on a similarity score map of the reference feature representation and the first feature representation, a first motion-embedding feature representation of the first comparison pair,
 generate a fusion result by fusing a plurality of motion-embedding feature representations comprising the first motion-embedding feature representation, and
 generate at least one restored image by decoding the fusion result.

12. The image restoration apparatus of claim 11, wherein the processor is further configured to:
 determine a first feature vector of a first point of the reference feature representation, and a first block of interest centered at a correspondence point of the first point in the first feature representation,
 generate a first similarity score map corresponding to the first point based on similarities between the first feature vector and channel vectors of the first block of interest,
 generate a first motion-aware kernel corresponding to the first point based on the first similarity score map,
 generate a first motion-embedding vector corresponding to the first point based on an operation between the first block of interest and the first motion-aware kernel, and
 generate the first motion-embedding feature representation based on motion-embedding vectors comprising the first motion-embedding vector.

13. The image restoration apparatus of claim 12, wherein the processor is further configured to:
 determine a second feature vector of a second point of the reference feature representation, and a second block of interest centered at a correspondence point of the second point in the first feature representation,
 generate a second motion-embedding vector corresponding to the second point based on the second block of interest, and
 generate the first motion-embedding feature representation based on the motion-embedding vectors comprising the first motion-embedding vector and the second motion-embedding vector.

14. The image restoration apparatus of claim 12, wherein the processor is further configured to:
 determine a first motion information vector corresponding to the first similarity score map,
 generate a first context information vector based on an operation between the first block of interest and the first similarity score map, and
 generate the first motion-aware kernel by fusing the first motion information vector and the first context information vector.

15. The image restoration apparatus of claim 14, wherein the processor is further configured to:
generate a first channel vector corresponding to the first motion information vector using a first fully connected network,
generate a second channel vector corresponding to the first context information vector using a second fully connected network, and
generate the first motion-aware kernel by fusing the first channel vector and the second channel vector.

16. The image restoration apparatus of claim 11, wherein the processor is further configured to:
select an anchor image from among the individual images, and
determine a feature representation of the anchor image from among the feature representations to be the reference feature representation.

17. The image restoration apparatus of claim 11, wherein the individual images comprise a first individual image and a second individual image, and
the at least one restored image comprises a first restored image of the first individual image and a second restored image of the second individual image,
wherein the processor is further configured to:
determine a feature representation of the first individual image from among the feature representations to be the reference feature representation, in case of restoring the first individual image as the first restored image, and
determine a feature representation of the second individual image from among the feature representations to be the reference feature representation, in case of restoring the second individual image as the second restored image.

18. An electronic device, comprising:
a camera configured to generate a burst image set comprising a plurality of individual images where the plurality of individual images was continuously captured; and
a processor configured to:
generate a plurality of feature representations corresponding to the individual images by encoding the individual images,
determine a reference feature representation from among the plurality of feature representations,
determine a first comparison pair comprising the reference feature representation and a first feature representation of the plurality of feature representations,
generate, based on a similarity score map of the reference feature representation and the first feature representation, a first motion-embedding feature representation of the first comparison pair,
generate a fusion result by fusing a plurality of motion-embedding feature representations comprising the first motion-embedding feature representation, and
generate at least one restored image by decoding the fusion result.

19. The electronic device of claim 18, wherein the processor is further configured to:
determine a first feature vector of a first point of the reference feature representation, and a first block of interest centered at a correspondence point of the first point in the first feature representation,
generate a first similarity score map corresponding to the first point based on similarities between the first feature vector and channel vectors of the first block of interest,
generate a first motion-aware kernel corresponding to the first point based on the first similarity score map,
generate a first motion-embedding vector corresponding to the first point based on an operation between the first block of interest and the first motion-aware kernel, and
generate the first motion-embedding feature representation based on motion-embedding vectors comprising the first motion-embedding vector.

20. The electronic device of claim 19, wherein the processor is further configured to:
determine a first motion information vector corresponding to the first similarity score map,
generate a first context information vector based on an operation between the first block of interest and the first similarity score map, and
generate the first motion-aware kernel by fusing the first motion information vector and the first context information vector.

21. An electronic device, comprising:
one or more processors configured to:
acquire a plurality of individual images included in an image burst set where the plurality of individual images was continuously captured;
calculate a correlation between the individual images to generate a kernel;
generate a feature representation of the individual images by applying a convolution operation to the individual images using the kernel; and
enhance the individual images based on the feature representation and output an enhanced image burst set including the enhanced individual images.

22. The electronic device of claim 21, wherein the one or more processors are configured to:
for the calculating of the correlation between the individual images to generate the kernel,
generate a plurality of feature representations corresponding to the individual images by encoding the individual images,
determine a reference feature representation from among the plurality of feature representations, and
determine a first comparison pair comprising the reference feature representation and a first feature representation of the plurality of feature representations;
for the generating of the feature representation, generate, as the feature representation, a first motion-embedding feature representation of the first comparison pair based on a similarity score map of the reference feature representation and the first feature representation;
generate a fusion result by fusing a plurality of motion-embedding feature representations comprising the first motion-embedding feature representation; and
for the enhancing of the individual images, generate at least one restored image by decoding the fusion result.

* * * * *